US00RE35976E

United States Patent [19]

Gasparrini et al.

[11] E Patent Number: Re. 35,976

[45] Reissued Date of Patent: Dec. 1, 1998

[54] PRE-PACKAGED, PRE-SOAKED CLEANING SYSTEM AND METHOD FOR MAKING THE SAME

[75] Inventors: Charles R. Gasparrini, Port Chester, N.Y.; Walter H. Cano, Bridgeport, Conn.

[73] Assignee: Baldwin Graphic Systems, Inc., Stamford, Conn.

[21] Appl. No.: 697,611

[22] Filed: Aug. 28, 1996

Related U.S. Patent Documents

Reissue of:

[64] Patent No.: 5,368,157
Issued: Nov. 29, 1994
Appl. No.: 145,881
Filed: Oct. 29, 1993

U.S. Applications:

[63] Continuation of Ser. No. 419,752, Apr. 10, 1995, abandoned.

[51] Int. Cl.[6] ..... B65D 85/67

[52] U.S. Cl. ..... 206/209; 206/410; 206/497; 53/431

[58] Field of Search ..... 206/205, 207, 206/209, 210, 398, 401, 410, 497, 524.1, 524.3, 361; 15/256.5, 256.51; 101/425; 53/431, 581, 582

[56] References Cited

U.S. PATENT DOCUMENTS

| | | |
|---|---|---|
| 2,189,556 | 2/1940 | Younghusband . |
| 3,014,579 | 12/1961 | Lathrop . |
| 3,669,255 | 6/1972 | Raymus . |
| 3,850,294 | 11/1974 | Phillips et al. . |
| 3,980,176 | 9/1976 | Boggs . |
| 4,135,448 | 1/1979 | Moestue . |
| 4,295,563 | 10/1981 | Becker et al. . |
| 4,344,361 | 8/1982 | MacPhee et al. . |
| 4,467,916 | 8/1984 | Hedden et al. . |
| 4,678,724 | 7/1987 | Inagabi . |
| 4,757,763 | 7/1988 | MacPhee et al. . |
| 4,934,391 | 6/1990 | Futch et al. . |
| 4,986,182 | 1/1991 | Sawaguchi et al. . |
| 4,998,984 | 3/1991 | Clendon . |
| 5,009,716 | 4/1991 | Gerson . |
| 5,012,739 | 5/1991 | Loos et al. . |
| 5,069,128 | 12/1991 | Hara et al. . |
| 5,104,567 | 4/1992 | Staehr . |
| 5,125,342 | 6/1992 | Hara . |
| 5,143,639 | 9/1992 | Krawack . |
| 5,176,080 | 1/1993 | Gasparrini et al. . |
| 5,188,754 | 2/1993 | Weltman et al. . |
| 5,194,173 | 3/1993 | Folkard et al. . |
| 5,207,160 | 5/1993 | Harada . |
| 5,320,217 | 6/1994 | Lenarz . |

FOREIGN PATENT DOCUMENTS

| | | |
|---|---|---|
| 2004511 | 8/1971 | Germany . |

*Primary Examiner*—Jacob K. Ackun
*Attorney, Agent, or Firm*—Morgan & Finnegan, L.L.P.

[57] ABSTRACT

There is disclosed a pre-packaged, pre-soaked cleaning system for use to clean the cylinders of printing machines. The system includes a pre-soaked fabric roll saturated to equilibrium with low volatility organic compound solvent which is wrapped around a cylindrical core having open ends to form a roll. The saturated, wrapped fabric roll is inserted in a heat-sealable or heat-shrinkable and heat-sealable plastic sleeve, the sleeve being to intimate contact with the fabric roll after being subjected in heat-sealing or heat-shrinking and heat-sealing, thus permitting transporting and storage of the system until use without detrimentally affecting the cleaning ability of the fabric roll.

The system may also include a slotted canister in which the saturated wrapped roll is inserted before it is placed into the plastic sleeve and heat-sealed or heat-shrunken and heat-sealed thereon or end caps inserted in the open ends of the core.

A method for making the system is also disclosed.

32 Claims, 1 Drawing Sheet

PRE-PACKAGED, PRE-SOAKED CLEANING SYSTEM AND METHOD FOR MAKING THE SAME

Matter enclosed in heavy brackets [ ] appears in the original patent but forms no part of this reissue specification; matter printed in italics indicates the additions made by reissue.

*This is a continuation of now abandoned application Ser. No. 08/419,752, filed on Apr. 10, 1995 and which is an application for reissue of U.S. Pat. No. 5,365,157 of Nov. 29, 1994.*

This invention relates to a cleaning system for use to clean the cylinders of printing machines. More particularly, the invention relates to a pre-packaged, pre-soaked blanket cleaning system to clean the cylinders of printing machines. While the invention is disclosed as it applies to the cleaning of the cylinders of printing machines for the sake of simplicity, it is to be understood that it can also be utilized to clean the cylinders of other types of machinery.

BACKGROUND OF THE INVENTION

A wide variety of blanket cleaning systems and apparatus employing the same to clean the cylinders of printing machinery are known. Typical blanket cleaning systems and apparatus employing the same, including cleaning blankets and cleaning solutions, are exemplified by U.S. Pat. No. 4,135,448 to Moestue which discloses a mechanism for cleaning a cylinder that is provided with a cleaning cloth which is wetted with a cleaning fluid or solution prior to its encountering the pressure roller; U.S. Pat. No. 4,934,391 to Futch et al. which shows a composition for ink removal that exhibits a low vapor pressure and which is a low vapor pressure organic compound; U.S. Pat. No. 4,986,182 to Sawaguchi et al. which discloses a cleaning apparatus in which a cleaning cloth is dampened by a liquid; U.S. Pat. No. 5,009,716 to Gerson which shows a wash for removing ink comprising a low volatile organic compound; U.S. Pat. No. 5,012,739 to Loos which discloses a washing device comprising a cleaning cloth dampened with a washing medium; and U.S. Pat. No. 5,069,128 to Hara which shows a device for cleaning a cylinder of a printing machine comprising a cleaning cloth impregnated with a cleaning liquid.

In addition, U.S. Pat. No. 5,104,567 to Staehr discloses a liquid for cleaning ink from printing machines; U.S. Pat. No. 5,125,342 to Hara shows a method for cleaning the cylinder of a printing machine; and U.S. Pat. No. 5,143,639 to Krawack discloses a cloth moistened with a low vapor pressure cleaning agent for removing ink; whereas Weltman et al., U.S. Pat. No. 5,188,754 disclose a cloth soaked with a cleaning formula, and U.S. Pat. No. 5,194,173 to Folkard et al. discloses a method for removing ink from printing machines. Still further, U.S. Pat. Nos. 4,344,361 and 4,757,763 to MacPhee et al. disclose automatic blanket cylinder cleaners provided with cleaner fabrics adapted to contact the blanket cylinders of printing machines. On the other hand, U.S. Pat. No. 5,175,080 to Gasparrini et al. discloses a cloth supply system for the blanket cylinder for use in printing presses.

While the above-mentioned Patents accomplish their purposes to a satisfactory extent, they still exhibit a variety of drawbacks. For example, they usually require apparatus, such as pumps, spray bars, manifold lines, valves and the like as part of the automatic blanket cleaning systems for introducing the cleaning solvents or solutions to the cleaning fabric just prior to actual use. Moreover, even in these cases, where the cleaning rolls or fabric rolls are pre-soaked or pre-wetted, the pre-soaking or pre-wetting must be accomplished just before use in order to minimize loss of cleaning solvent or solution in order to provide an effective blanket cleaning system.

There exists, therefore, a need for providing a pre-packaged, pre-soaked blanket cleaning system which does not exhibit the above-mentioned disadvantages and drawbacks. The present invention fulfills such a need.

BRIEF STATEMENT OF THE INVENTION

In accordance with the invention there is provided a pre-packaged, pre-soaked cleaning system for use with printing machines to clean the cylinders thereof comprising:

(1) a pre-soaked fabric roll saturated to equilibrium with low volatility organic compound solvent and which is disposed around an elongated, cylindrical core having open ends, and (2) a heat-sealed or a heat-shrunken and heat-sealed plastic sleeve disposed around and in intimate contact with the fabric roll, whereby the pre-soaked, saturated fabric roll can be transported and stored vertically and/or horizontally until use without substantially disturbing the distribution of the solvent in the fabric roll and detrimentally affecting the cleaning ability of the fabric.

The invention also includes the method for making the inventive pre-packaged, pre-soaked cleaning system. Broadly, the method comprises contacting a strip of cleaning fabric with low volatility organic compound solvent which does not evaporate readily at ambient temperature and pressure and pre-soaking and saturating the fabric with the solvent, draining off excess solvent from the saturated fabric and obtaining a fabric saturated to equilibrium with solvent; wrapping the drained, saturated fabric around an elongated cylindrical core having open ends and forming a roll; disposing a heat-sealable plastic sleeve around the saturated, drained, wrapped fabric roll and subjecting the saturated, drained, wrapped fabric roll to a temperature sufficient to heat-seal the plastic sleeve around the saturated, drained, wrapped fabric roll in intimate contact with the fabric roll, whereby the pre-soaked, saturated fabric roll can be transported and stored vertically and/or horizontally until use without substantially disturbing the distribution of the solvent in the fabric roll and detrimentally affecting the cleaning ability of the fabric roll.

In a more specific aspect of the method, the strip of cleaning fabric is wrapped around the elongated cylindrical core to form a roll before contacting the strip of cleaning fabric with solvent.

In still another more specific aspect of the method, it includes subjecting the heat-sealable plastic sleeve to a vacuum and drawing the sleeve into intimate contact with the wrapped fabric roll after it has been disposed in the heat-sealable plastic sleeve.

In yet another more specific aspect of the method, the cleaning fabric is contacted with the low volatility organic compound solvent after the fabric is wrapped on the cylindrical core to form a roll by immersing the wrapped fabric roll in the solvent at ambient pressure and temperature and then drained at ambient pressure and temperature to remove excess solvent.

In yet another more specific aspect of the method, when the cleaning fabric is pre-soaked, either as a flat sheet or as a roll after it has been wrapped onto a cylindrical core, it is preferable that the fabric be subjected to a vacuum in a vacuum chamber or the like in order to remove air therefrom before pre-soaking thereof takes place. In this connection, any suitable vacuum chamber or device can be employed.

Still further in another more specific aspect of the method, the plastic sleeve employed is not only heat-sealable but also heat-shrinkable and the sleeve is subjected to a temperature sufficient to heat-seal and heat-shrink the sleeve around the fabric roll.

In addition, the method, in another more specific aspect, includes the insertion of end caps in the open ends of the elongated cylindrical core and which extend over the peripheral edges of the fabric roll before the roll is inserted in the plastic sleeve.

Thus, in another embodiment of the pre-packaged, pre-soaked cleaning system according to the invention described above, the system includes a plastic sleeve disposed around and in intimate contact with the fabric roll which is not only heat-sealed, but also heat-shrunken.

Moreover, in a still further modified embodiment, the system includes end caps inserted in the open ends of the elongated cylindrical core which extend over the peripheral edges of the fabric roll.

In still a further modified embodiment of the pre-packaged and pre-soaked blanket cleaning system of the invention, it may also include a slotted canister in which the wrapped, drained, saturated roll is disposed. In such modified embodiment, the method of making the system is also modified to include an additional step of inserting the wrapped drained, saturated fabric roll into the slotted canister before introducing the same into the plastic sleeve.

THE DRAWINGS

In order to understand the invention more fully, reference is directed to the accompanying Drawing, which is to be taken in conjunction with following detailed description of the invention and in which Drawing:

FIG. 1 is a lateral, sectional, elevational view of a pre-packaged, pre-soaked cleaning system according to the invention;

FIG. 2 is a lateral, sectional, elevational view of the system shown in FIG. 1, including the disposition of the pre-soaked, wrapped roll in a slotted canister before it is inserted in the heat-sealable sleeve and/or heat-sealable and heat-shrinkable sleeve shown in FIG. 1; and FIG. 3 is a partial, sectional, elevational, diagrammatic view of the system shown in FIG. 1 employing end caps disposed in the open ends of the elongated cylindrical core and extending over the peripheral edges of the fabric roll.

DESCRIPTION OF THE PREFERRED EMBODIMENTS

Figure 1:
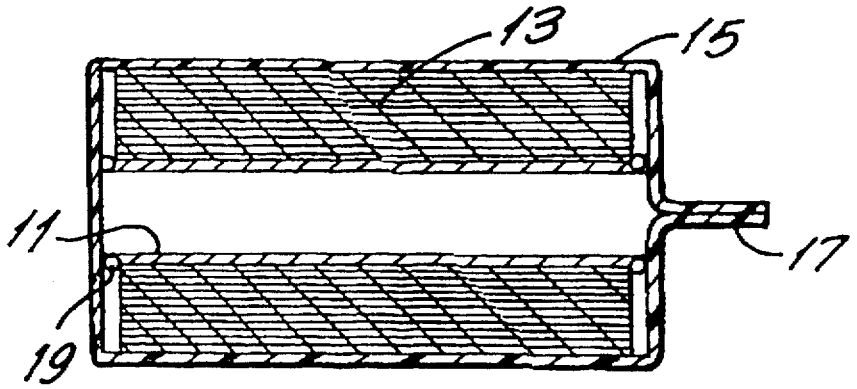

Referring now to FIG. 1, a pre-packaged, pre-soaked cleaning system according to the invention comprises an elongated cylindrical core 11 made from, for example, relatively heavy cardboard of sufficient strength so that it can support thereon a pre-soaked fabric roll 13 of paper or cloth. On the other hand, if desired, the core may also be made of metal, such as steel, aluminum and the like. The fabric is pre-soaked and saturated to equilibrium with low volatility organic compound solvent, as described in more detail hereinbelow, before or after it is wrapped around the core 11 to form roll 13 in any convenient manner and the roll is then inserted in a sleeve 15 made of heat-sealable or heat-sealable and heat-shrinkable plastic material which is heat-sealed along its edge 17 or heat-shrunken and heat-sealed along its edge 17, so that sleeve 15 is in intimate contact with the fabric roll 13. The core 11 is also preferably provided with engagement means 19, such as ball bearings or the like, or with other suitable means, for reception of a shaft 21 (FIG. 2) located on an appropriate machine, such as a printing machine or the like (not shown) provided with a take-up roll to take-up cleaning fabric after it has achieved its cleaning function.

It has been surprisingly found that the pre-packaged, pre-soaked cleaning system described is a very stable system which can be transported and stored in a horizontal and/or vertical disposition until use without substantially disturbing the distribution of the solvent in the fabric roll and detrimentally affecting the cleaning ability of the fabric.

Figure 2:
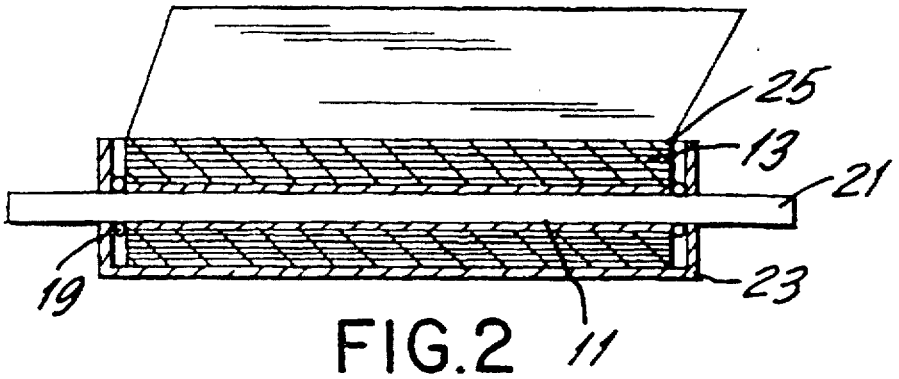

In the modified embodiment of the invention illustrated in FIG. 2, the pre-soaked roll is inserted in a canister 23, provided with a slit 25 through which a portion of the fabric roll 13 can be withdrawn before the assembly is sealed in the sleeve 15.

Figure 3:
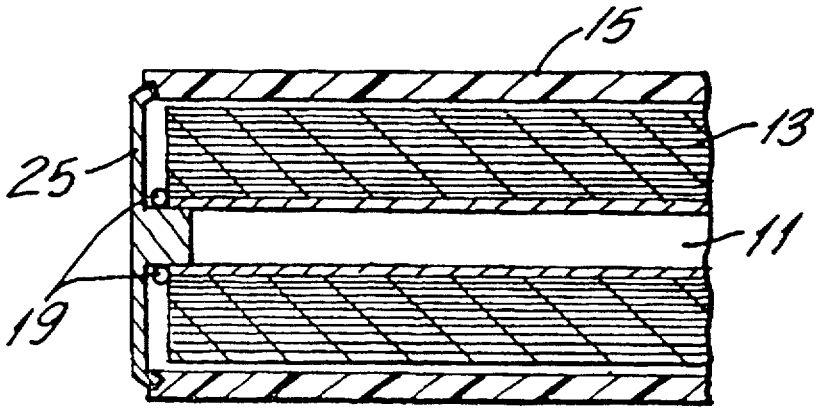

In the modified embodiment as shown in FIG. 3, the system of this invention is also preferably provided with end caps, such as end cap 25, made of plastic or metal or the like disposed in the open ends of the core 11. The end caps extend over the peripheral edges of the fabric roll 13 and the sleeve 15 may extend, as shown, over the edges of the end caps, or it may extend completely around the ends of the roll 13 as shown in FIG. 1. Obviously, when a slotted canister 23 is employed, end caps will not be used. Moreover, it is to be understood that it is within the purview of this invention that the sleeve is sized conveniently to accommodate the roll to be covered thereby and to be drawn or shrunken into intimate contact with the roll and heat-sealed, as needed, whether it be open at both ends or at one end only.

The fabric from which the fabric roll is made may vary widely. For example, it may be made of paper or cloth. In those cases where a cloth fabric is employed, it may be a woven or a non-woven cloth fabric made of synthetic or natural fibers or mixtures of the same. Exemplative, but not limitative, of suitable synthetic fibers which may be used in the cloth fabrics are polyester fibers, rayon fibers, nylon fibers, and acrylic fibers and the like. Exemplative, but not limitative, of the natural fibers which may be employed are cotton fibers, wood pulp fibers and hemp fibers and the like.

In those cases where paper is employed as the fabric material, paper fabrics made from wood pulp modified chemically in accordance with paper manufacturing technology are suitable, for example.

On the other hand, no matter whether paper or cloth fabric is employed in carrying out the practice of this invention, it is preferred that the materials used therein exhibit high acceptability to being soaked or wetted by the low volatility organic compound solvent used to saturate the same. In this regard, it is preferred that the fabric employed be one which has a caliper thickness in a range of from about 0.003 [mils] *inch* to about [0.030 mils] *0.30 inch*, and preferably in a range of from about 0.008 [mils] *inch* to about 0.020 [mils] *inch*, and the ability when saturated with low volatility organic compound solvent to retain from about 0.05 to about 0.5 cc of solvent per $in^2$ of fabric determined by routine testing methods.

In general, woven and non-woven fabrics suitable for use in carrying out the practice of the invention have a basis weight in a range of from about 1.5 ounces per square yard to about 6.0 ounces per square yard, a caliper thickness in the range mentioned above, a tensile strength in the longitudinal (machine) direction in a range of from about 20 lbs.

per inch to about 200 lbs. per inch and in a width (cross) direction in a range of from about 15 lbs per inch to about 125 lbs. per inch.

Where paper is employed as a cleaning fabric in the system of this invention, it has a basis weight in a range of from about 40 lbs. to about 90 lbs., a caliper thickness in a range of from abut 0.003 [mils] *inch* to about 0.10 [mils] *inch*, a tensile strength in the longitudinal (machine) direction in a range of from about 20 lbs. per inch to about 80 lbs. per inch and in the width (cross) direction in a range of from abut 15 lbs. per inch to about 50 lbs. per inch, a porosity in a range of from about 1.0 second to about 10 seconds when subjected to 100 cc of low volatility organic compound solvent or water, and a stretchability in a range of from about 1.0 percent to about 6.0 percent, all determined by routine testing methods.

The low volatility organic compound solvent employed in carrying out the practice of this invention may vary widely and generally it includes at least one low volatility organic compound solvent which does not readily evaporate, as well as mixtures of the same with similar low volatile organic compound solvents or with normally volatile organic compound solvents. Exemplative, but not limitative, of suitable solvent materials of this type are organic compound solvents selected from vegetable oils and citrus oil and the like. Generally, such solvent materials have a volatility in a range of from about zero up to about 30.0 percent, and preferably a volatility in a range of from about zero percent to about 20.0 percent, determined by routine testing methods. It is to be understood that within the purview of this invention, such suitable solvents also include normally volatile organic compound solvents, that is, those which readily evaporate and which are selected from mineral spirits and aliphatic hydrocarbon solvents and the like. Such solvent materials generally have a volatility of from zero up to about 100 percent determined by routine testing methods.

A wide variety of heat-sealable and/or heat-shrinkable and heat-sealable plastic materials may be used for the plastic sleeves employed in the practice of this invention. For example, the sleeve may be made from polyethylenes, polyolefins, polyvinyl chlorides, and polyamides and the like. Generally, such materials are heat-sealable and/or heat-shrinkable and heat-sealable at a temperature in a range of from about 300° F. to about 400° F., and preferably in a range of from about 350° F. to about 375° F. Moreover, it is to be understood that within the purview of this invention, the heat-sealable and/or heat-shrinkable and heat-sealable sleeve may be made from heat-sealable and/or heat-shrinkable and heat-sealable paper.

The method for making a pre-packaged, pre-soaked cleaning system according to the invention comprises contacting a strip of cleaning fabric with low volatility organic compound solvent which does not evaporate readily at ambient pressure and temperature and pre-soaking and saturating the fabric with the solvent, draining of excess solvent from the saturated fabric and obtaining a fabric saturated to equilibrium with the solvent; wrapping the drained, saturated fabric around an elongated cylindrical core having open ends and forming a roll; disposing a heat-sealable plastic sleeve around the drained, saturated, wrapped fabric roll and subjecting the sleeve to a temperature sufficient to heat seal the plastic sleeve around the drained, saturated, wrapped fabric roll in intimate contact with the fabric roll, whereby the pre-soaked, saturated fabric roll can be transported and stored vertically and/or horizontally until use without disturbing the distribution of the solvent in the fabric roll and detrimentally affecting the cleaning ability of the fabric roll.

In a variation of the method, the fabric is preferably wrapped around the core before contacting the same with the solvent. Wrapping of the fabric on the cylindrical core can be done in any convenient manner and requires no special apparatus, a wide variety of roll making equipment being readily available for accomplishing the same.

Whether the fabric is contacted with solvent either before or after the roll has been formed, the roll is then inserted in a heat-sealable and/or heat-sealable and heat-shrinkable plastic sleeve and the sleeve is heat-sealed and/or heat-sealed and heat-shrunken at any appropriate temperature around the roll in intimate contact therewith. Generally, temperatures in a range of from about 300° F. to about 400° F. and preferably in a range of from about 350° F. to about 375° F. to accomplish the heat sealing and/or heat sealing and heat-shrinking of the saturated fabric roll in the plastic sleeve and bring the sleeve into intimate contact with the fabric roll, as mentioned above, may be employed.

In a variation of the method, it is preferred, especially where a heat-sealable plastic sleeve is employed, that once the fabric roll is inserted in the sleeve, the so assembled sleeve and roll be subjected to a vacuum which draws the heat-sealable plastic sleeve into intimate contact with the wrapped fabric roll, while at the same time exhausting any air from the interior of the sleeve, and then simply heat-sealing the sleeve around the roll by application of heat to the open peripheral edges of the sleeve. Known appropriate vacuum apparatus and heat-sealing apparatus may be used by simple adaptation of the same physically to accomplish apparatus for applying the vacuum and heat-sealing of the sleeve.

On the other hand, where a sleeve employed in carrying out the method in both heat-sealable and heat-shrinkable, then one or more small openings or vent holes (not shown) in the sleeve, preferably located near the open edges of the sleeve, are provided to permit exhaustion of air from the sleeve as heat-sealing and heat-shrinking is accomplished, the location of such opening or openings assuring that any such opening or openings will be closed during the heat-sealing and heat-shrinking of the sleeve.

In accordance with the method of this invention, contact between the fabric strip and the solvent can be achieved in a variety of ways. For example, if desirable, the appropriate solvent may be poured over the fabric in amounts sufficient to saturate the same while simply permitting excess solvent to drain off into a tray, or the solvent can be sprayed on the fabric. The saturation step can be carried out at ambient temperature and pressure and the excess, as mentioned, simply permitted to drain off for a period of time sufficient to obtain a fabric saturated to equilibrium with the solvent.

However, it is within the purview of the invention that the fabric strip be immersed or transported through a tank of appropriate solvent in a substantially horizontal direction either before or after, and preferably after, it has been wrapped on the core to form a roll. After saturation has taken place, the saturated fabric is preferably simply suspended in a position to permit excess solvent to drain off and be collected in a trap for reuse.

Wrapping of the fabric on the elongated cylindrical core to form a roll, as well as draining thereof, may also take place at ambient temperature and pressure. When saturation and wrapping to form a roll are completed, the roll is inserted in the heat-sealable or heat-shrinkable and heat-sealable plastic sleeve and the sleeve is heat-sealed and/or heat-shrunk and heat-sealed at a temperature sufficient to heat-seal or heat-shrink and heat-seal the sleeve around the drained, saturated, wrapped fabric roll in intimate contact with the fabric roll. In this regard, the particular heat-shrinking and heat-sealing temperature will be dependent upon the type of heat-shrinkable and heat-sealable material utilized and may extend in a range of from about the softening temperature of such material up to about the decomposition temperature of such material. Care must be taken, however, to be sure that the particular temperature employed is not so high that it will have a deleterious effect on the saturated fabric roll disposed in the plastic sleeve.

In general, heat-shrinking and heat-sealing can be achieved at temperatures in a range of from about 300° F. up to about 400° F., and preferably are achieved at temperatures in a range of from about 350° F. up to about 375° F. and may be carried out in an oven, or under heat-radiating lamps.

The plastic sleeve will be sized so that the wrapped roll can be inserted therein with facility and the open edges of the sleeve then brought together in contact with each other in order to seal the same, while at the same time, being sized also so that when shrinking takes place, it will be brought into intimate contact with the fabric roll around which it is disposed.

In those cases where the saturated wrapped fabric roll is to be employed with a slotted canister, the roll is simply inserted in the canister with a portion thereof protruding through the slot and the canister is provided with knock-out end portions which may be inserted therein after insertion of the roll, such end portions simply being removed when the roll is to be disposed on an appropriate shaft of a printing apparatus or the like in order to permit insertion of the shaft through the core of the roll, as well as removal of the shaft from the core. Moreover, the canister may be made from metals, such as light gauge steel, aluminum and the like or from cardboard or from plastic materials, such as polyethylenes, polyolefins, polyvinyl chlorides, polyamides, and the like.

In those instances where end caps, such as end cap 25, are employed in making the pre-packaged, pre-soaked cleaning system of this invention, the end caps, which may be made of the same materials mentioned above for the canister 23, are simply inserted in the open ends of the cylindrical core after the wrapping, saturation and draining steps of the method have been accomplished.

It is to be understood that within the context of this invention, the terminology "saturated to equilibrium" as it is used in connection with the saturation of the fabric and/or fabric roll with solvent means that after draining the fabric and/or fabric roll retains therein sufficient solvent in an amount to wet the fabric to the extent that it imparts efficient cleaning ability to the fabric to clean cylinders of apparatus, such as printing machinery, and the fabric has retained therein after draining from about 0.05 to about 0.5 cc of solvent per $in^2$ of fabric.

The so-made pre-packaged, pre-soaked blanket cleaning system of this invention can be employed on any printing apparatus, simply by modifying the apparatus to provide it with a shaft which can be inserted through the core and also a take-up roll which is employed to take up the used portion of the cleaning fabric after it has carried out its cleaning function. This is a distinct advantage of the cleaning system of this invention since it eliminates the need for complex apparatus, such as pumps, spray bars, manifold lines, valves and the like, especially as part of the automatic blanket cleaning systems used on printing machinery to introduce cleansing solvents or solutions to the cleaning fabrics just prior to use.

In addition, the cleaning system of this invention provides numerous other advantages. For example, it is relatively simple in construction, employs readily available materials and can be made in a relatively simple and forward manner without resort to highly complex and expensive procedures which necessitate the use of elaborate machinery. Numerous other advantages of this invention will be readily apparent to those skilled in the art.

Accordingly, this invention is not to be limited to the embodiments disclosed and illustrated herein, except as defined in the appended claims.

What is claimed is:

1. A pre-packaged, pre-soaked cleaning system for use to clean the cylinders of printing machines comprising:

(1) a pre-soaked fabric roll saturated to equilibrium with low volatility organic compound solvent disposed around an elongated cylindrical core having open ends, and (2) a heat-sealed plastic sleeve disposed around and in intimate contact with said fabric roll, whereby the pre-soaked, saturated fabric roll can be transported and stored vertically and horizontally until use without substantially disturbing the distribution of said solvent in said fabric roll and detrimentally affecting the cleaning ability of the fabric.

2. A pre-packaged, pre-soaked cleaning system as defined in claim 1 wherein the fabric is a cloth fabric.

3. A pre-packaged, pre-soaked cleaning system as defined in claim 2 wherein the cloth comprises non-woven synthetic fiber material.

4. A pre-packaged, pre-soaked cleaning system as defined in claim 2 wherein the cloth comprises woven synthetic fiber material.

5. A pre-packaged, pre-soaked cleaning system as defined in claim 2 wherein the cloth comprises non-woven natural fiber material.

6. A pre-packaged, pre-soaked cleaning system as defined in claim 2 wherein the cloth comprises woven, natural fiber material.

7. A pre-packaged, pre-soaked cleaning system as defined in claim 2 wherein the cloth comprises a mixture of synthetic and natural fiber materials.

8. A pre-packaged, pre-soaked cleaning system as defined in claim 2 wherein the fabric has a basis weight in a range of from about 1.5 ounces per square yard to about 6.0 ounces per square yard, a caliper thickness in a range of from about 0.003 [mils] *inch* to about 0.30 [mils] *inch*, a tensile strength in the longitudinal direction in a range of from about 20 lbs. per inch to about 200 lbs. per inch and in a width direction in a range of from about 15 lbs. per inch to about 125 lbs. per inch.

9. A pre-packaged, pre-soaked cleaning system as defined in claim 1 wherein the fabric is paper fabric.

10. A pre-packaged, pre-soaked cleaning system as defined in claim 9 wherein the paper fabric has a basis weight in a range of from about 40 lbs. to about 90 lbs., a caliper thickness in a range of from about 0.003 [mils] *inch* to about [0.010 mils] *0.10 inch*, a tensile strength in the longitudinal direction in a range of from about 20 lbs. per inch to about 80 lbs. per inch and in a width direction in a range of from about 15 lbs. per inch to about 50 lbs. per inch, a porosity in a range of from about 1.0 second to about 10 seconds, and a stretchability in a range of from about 1.0 percent to about 6.0 percent.

11. A pre-packaged, pre-soaked cleaning system as defined in claim 1 wherein the low volatility organic compound solvent comprises at least one organic solvent compound which does not readily evaporate and is selected from the group consisting of vegetable oils and citrus oils having a volatility in a range of from about zero up to about 30 percent.

12. A pre-packaged, pre-soaked cleaning system as defined in claim 1 wherein the low volatility organic compound solvent comprises at least one organic solvent compound which readily evaporates and which is selected from mineral spirits and aliphatic hydrocarbon solvents and a volatility in a range of from about zero up to about 100 percent.

13. A pre-packaged, pre-soaked cleaning system as defined in claim 1 wherein the heat-sealed plastic sleeve is comprised of a heat-sealable plastic material selected from the group consisting of heat sealable polyethylenes, heat-sealable polyolefins, polyvinyl chlorides, and heat-sealable polyamides.

14. A pre-packaged, pre-soaked cleaning system as defined in claim 1 wherein the heat-sealed plastic sleeve is also heat-shrinkable and is comprised of a heat-sealable and heat-shrinkable plastic material selected from the group consisting of heat-sealable and heat-shrinkable polyethylenes, heat-sealable and heat-shrinkable polyolefins, heat-sealable and heat-shrinkable polyvinyl chlorides, and heat-sealable and heat-shrinkable polyamides.

15. A pre-packaged, pre-soaked cleaning system according to claim 1 including a canister disposed between the pre-soaked fabric roll and the heat-sealed plastic sleeve.

16. A pre-packaged, pre-soaked cleaning system according to claim 1 including end caps located in the open ends of the elongated cylindrical core and extending over the peripheral edges of the fabric roll.

17. A method for making a pre-packaged, pre-soaked cleaning system comprising contacting a strip of cleaning fabric with low volatility, organic compound solvent which does not evaporate readily at ambient temperature and pressure and pre-soaking and saturating said fabric with said solvent, draining off excess solvent from said saturated fabric and obtaining a fabric saturated to equilibrium with said solvent; wrapping the drained, saturated fabric around an elongated cylindrical core having open ends and forming a roll; disposing a heat-sealable plastic sleeve around the drained, saturated, wrapped fabric roll and subjecting said plastic sleeve to a temperature sufficient to heat-seal said plastic sleeve around said drained, saturated, wrapped fabric roll in intimate contact with the fabric roll, whereby the pre-soaked, saturated fabric roll can be transported and stored vertically and horizontally until use without substantially disturbing the distribution of said solvent in said fabric roll and detrimentally affecting the cleaning ability of the fabric roll.

18. A method for making a pre-packaged, pre-soaked cleaning system as defined in claim 17 wherein the strip of cleaning fabric is wrapped around the elongated cylindrical core to form a roll before contacting said strip of cleaning fabric with the solvent.

19. A method for making a pre-packaged, pre-soaked cleaning system according to claim 17 including subjecting the heat-sealable plastic sleeve to a vacuum and drawing the heat-sealable plastic sleeve into intimate contact with the wrapped fabric roll after disposing the wrapped fabric roll in said heat-sealable plastic sleeve and before heat-sealing said plastic sleeve.

20. A method for making a pre-packaged, pre-soaked cleaning system according to claim 17 including inserting the wrapped fabric roll into a slotted canister before it is introduced into the plastic sleeve.

21. A method for making a pre-packaged, pre-sealed cleaning system according to claim 17 including inserting end caps in the open ends of the elongated cylindrical core which extend over the peripheral edges of the fabric roll before said fabric roll is inserted into the plastic sleeve.

22. A method for making a pre-packaged, pre-soaked cleaning system as defined in claim 17 wherein the cleaning fabric is immersed at ambient temperature and pressure in the low volatility organic compound solvent to saturate said fabric and then drained at ambient temperature and pressure to remove excess solvent before said fabric is wrapped on the cylindrical core to form a roll.

23. A method for making a pre-packaged, pre-soaked cleaning system as defined in claim 17 wherein the cleaning fabric is immersed at ambient temperature and pressure in the low volatility organic compound solvent to saturate said fabric and then drained at ambient temperature and pressure to remove excess solvent after said fabric is wrapped on the cylindrical core to form a roll.

24. A method according to claim 17 wherein the cleaning fabric is paper.

25. A method for making a pre-packaged, pre-soaked cleaning system comprising contacting a strip of cleaning fabric with low volatility, organic compound solvent which does not evaporate readily at ambient temperature and pressure and pre-soaking and saturating said fabric with said solvent, draining off excess solvent from said saturated fabric and obtaining a fabric saturated to equilibrium with said solvent; wrapping the drained, saturated fabric around an elongated cylindrical core and forming a roll; disposing a heat-shrinkable and heat-sealable plastic sleeve around the drained, saturated, wrapped fabric roll and subjecting said plastic sleeve to a temperature sufficient to heat-shrink and heat-seal said plastic sleeve around said drained, saturated, wrapped fabric roll in intimate contact with the fabric roll, whereby the pre-soaked, saturated fabric roll can be transported and stored vertically and horizontally until use without substantially disturbing the distribution of said solvent in said fabric roll and detrimentally affecting the cleaning ability of the fabric roll.

26. A method for making a pre-packaged, pre-soaked cleaning system as defined in claim 25 wherein the plastic sleeve is heat-shrunken and heat-sealed at a temperature in a range of from about 300° F. to about 400° F.

27. A method for making a pre-packaged, pre-soaked cleaning system as defined in claim 25 wherein the plastic sleeve is heat-shrunken and heat-sealed at a temperature in a range of from about 350° F. to about 375° F.

*28. A pre-packaged, pre-soaked cleaning system for use to clean the cylinders of printing machines comprising:*

*(1) a pre-soaked fabric roll saturated to equilibrium with low volatility organic compound solvent disposed around a core, and*

*(2) a sealed sleeve disposed around and in contact with said fabric roll, whereby the pre-soaked, saturated fabric roll can be transported and stored vertically and horizontally until use without substantially disturbing the distribution of said solvent in said fabric roll and detrimentally affecting the cleaning ability of the fabric.*

*29. A pre-packaged, pre-soaked cleaning system as defined in claim 28 wherein the sealed sleeve can be opened or removed from the fabric roll for use of said fabric roll and including in combination therewith means for positioning said pre-packaged, pre-soaked cleaning system adjacent a cylinder to be cleaned.*

*30. A pre-packaged, pre-soaked cleaning system as defined in claim 1 wherein the sealed sleeve can be opened*

*or removed from the fabric roll for use of said fabric roll and including means locating said fabric roll adjacent to and operatively associated with a cylinder to be cleaned.*

*31. A pre-packaged, pre-soaked cleaning system as defined in claim 28, in combination with mounting means for mounting the pre-soaked fabric roll in a position to clean a cylinder while the fabric is in contact with and being fed past said cylinder.*

*32. A pre-packaged, pre-soaked cleaning system for use to clean the cylinder of printing machines comprising in combination:*

*(1) a pre-soaked fabric roll saturated to equilibrium with cleaning solvent disposed around a core, said fabric roll having a sealed sleeve which can be opened or removed from said fabric roll for use of said fabric roll, disposed therearound, and said system including*

*(2) means for locating said fabric roll adjacent to and operatively associated with a cylinder to be cleaned.*

* * * * *